US010282396B2

United States Patent
Allen et al.

(10) Patent No.: US 10,282,396 B2
(45) Date of Patent: May 7, 2019

(54) MARKUP LANGUAGE NAMESPACE DECLARATION RESOLUTION AND PRESERVATION

(71) Applicant: International Business Machines Corporation, Armonk, NY (US)

(72) Inventors: Corville O. Allen, Morrisville, NC (US); Albert A. Chung, Cary, NC (US); Arthur L. De Magalhaes, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 14/272,019

(22) Filed: May 7, 2014

(65) Prior Publication Data

US 2015/0324335 A1 Nov. 12, 2015

(51) Int. Cl.
*G06F 17/00* (2006.01)
*G06F 17/22* (2006.01)
*G06F 17/30* (2006.01)
*G06F 17/27* (2006.01)
(Continued)

(52) U.S. Cl.
CPC ........ *G06F 17/2247* (2013.01); *G06F 9/5016* (2013.01); *G06F 12/00* (2013.01); *G06F 17/2205* (2013.01); *G06F 17/227* (2013.01); *G06F 17/2229* (2013.01);
(Continued)

(58) Field of Classification Search
CPC .................................................. G06F 17/2247
See application file for complete search history.

(56) References Cited

U.S. PATENT DOCUMENTS 7,165,239 B2 * 1/2007 Hejlsberg .............. G06F 9/4488
717/114
7,366,735 B2 * 4/2008 Chandrasekar ... G06F 17/30911
(Continued)

OTHER PUBLICATIONS

The Apache Software Foundation; "Interface OMElement"; 17 pages; Retrieved from Wayback Machine; https://web.archive.org/web/20130128043338/http://ws.apache.org/axiom/apidocs/org/apache/axiom/om/OMElement.html[Jan. 11, 2016 2:01:58 PM]; https://web.archive.org/web/20130128043338/http://ws.apache.org/axiom/apidocs/org/apache/axiom/om/OMElement.html.*
(Continued)

*Primary Examiner* — Scott T Baderman
*Assistant Examiner* — Benjamin Smith
(74) *Attorney, Agent, or Firm* — Lee Law, PLLC; Christopher B. Lee

(57) ABSTRACT

An object of an in-memory object model created from markup language syntax is identified. The in-memory object model includes an element value that includes both a prefix part and a local value part. A determination is made that the element value, that includes both the prefix part and the local value part, does not have a corresponding data type definition within a schema specification used to define data types within the markup language syntax. A namespace resolver service is invoked using at least the prefix part of the element value. A valid namespace declaration of the prefix part is received from the namespace resolver service. The valid namespace declaration is associated with the prefix part as a namespace definition for the local value part of the element value.

10 Claims, 6 Drawing Sheets

(51) Int. Cl.
*G06F 12/00* (2006.01)
*G06F 9/50* (2006.01)

(52) U.S. Cl.
CPC ........ *G06F 17/272* (2013.01); *G06F 17/2705* (2013.01); *G06F 17/30914* (2013.01)

(56) References Cited

U.S. PATENT DOCUMENTS

| | | | | |
|---|---|---|---|---|
| 7,603,474 B2* | 10/2009 | Stern | ................... | H04L 69/22 709/232 |
| 7,725,503 B2* | 5/2010 | Doise | ................... | G06F 8/437 707/791 |
| 7,730,467 B1* | 6/2010 | Hejlsberg | ............ | G06F 17/2247 717/142 |
| 7,873,663 B2* | 1/2011 | Willis | ................... | G06F 17/2247 707/758 |
| 7,886,041 B2* | 2/2011 | Outhred | ................... | G06F 8/65 703/21 |
| 7,925,966 B2 | 4/2011 | Kaler et al. | | |
| 8,191,040 B2* | 5/2012 | Hejlsberg | ............ | G06F 9/4488 717/114 |
| 8,209,361 B2* | 6/2012 | Idicula | ................ | G06F 17/2205 707/796 |
| 8,229,974 B2* | 7/2012 | Lowry | ................... | G06F 8/20 707/803 |
| 8,555,261 B1* | 10/2013 | Hejlsberg | ............ | G06F 17/2247 717/142 |
| 8,880,538 B1* | 11/2014 | Petersson | ............ | H03M 7/707 707/756 |
| 8,918,710 B2* | 12/2014 | Srivastava | ......... | G06F 17/30908 715/234 |
| 9,015,575 B2* | 4/2015 | Young | ................... | G06F 17/243 715/234 |
| 9,336,327 B2* | 5/2016 | Melnik | ............. | G06F 17/30917 |
| 9,396,171 B2* | 7/2016 | Bitonti | ................. | G06F 17/2247 |
| 2002/0178276 A1* | 11/2002 | McCartney | ....... | G06F 17/30017 709/231 |
| 2003/0101195 A1* | 5/2003 | Linhart | ............... | G06F 9/44521 |
| 2003/0172196 A1* | 9/2003 | Hejlsberg | ............ | G06F 9/4488 719/328 |
| 2004/0039964 A1* | 2/2004 | Russell | ............... | G06F 9/4493 714/25 |
| 2004/0193388 A1* | 9/2004 | Outhred | ................... | G06F 8/65 703/1 |
| 2005/0086584 A1* | 4/2005 | Sampathkumar | ... | G06F 17/2247 715/235 |
| 2005/0114771 A1* | 5/2005 | Piehler | ................... | G06F 17/21 715/264 |
| 2005/0132279 A1* | 6/2005 | Relyea | ................... | G06F 17/2247 715/234 |
| 2005/0144556 A1* | 6/2005 | Petersen | ............... | G06F 17/2247 715/242 |
| 2005/0228828 A1* | 10/2005 | Chandrasekar | ... | G06F 17/30911 |
| 2005/0273703 A1* | 12/2005 | Doughan | ............ | G06F 17/30345 715/234 |
| 2005/0283645 A1* | 12/2005 | Turner | ................. | G06F 11/1076 714/4.11 |
| 2006/0074734 A1* | 4/2006 | Shukla | ................... | G06F 8/10 717/107 |
| 2006/0074736 A1* | 4/2006 | Shukla | ................... | G06Q 10/06 717/100 |
| 2006/0074838 A1* | 4/2006 | Srivastava | ......... | G06F 17/30908 |
| 2006/0242142 A1* | 10/2006 | Coen | ................... | G06F 17/30569 |
| 2006/0253465 A1* | 11/2006 | Willis | ................... | G06F 17/2247 |
| 2007/0078997 A1* | 4/2007 | Stern | ................... | H04L 67/02 709/230 |
| 2008/0216052 A1* | 9/2008 | Hejlsberg | ............ | G06F 9/4488 717/114 |
| 2008/0228810 A1* | 9/2008 | Matsa | ................... | G06F 17/2247 |
| 2009/0150367 A1* | 6/2009 | Melnik | ............. | G06F 17/30917 |
| 2009/0254806 A1* | 10/2009 | Bitonti | ................. | G06F 17/2247 715/234 |
| 2010/0010995 A1* | 1/2010 | Fablet | ................... | H03M 7/30 706/46 |
| 2010/0023486 A1* | 1/2010 | Baras | ................... | G06F 17/2247 707/E17.014 |
| 2010/0036869 A1* | 2/2010 | Lowry | ................... | G06F 8/20 707/E17.009 |
| 2010/0088588 A1* | 4/2010 | Fablet | ................. | G06F 17/2229 715/234 |
| 2011/0179089 A1* | 7/2011 | Idicula | ............... | G06F 17/2205 707/803 |
| 2014/0032604 A1* | 1/2014 | Young | .................. | G06F 17/243 707/797 |
| 2015/0324335 A1* | 11/2015 | Allen | .................... | G06F 17/272 715/237 |
| 2015/0324337 A1* | 11/2015 | Allen | .................... | G06F 17/272 715/234 |

OTHER PUBLICATIONS

Aaron Skonnard; "Understanding XML Namespaces"; Jul. 2002; https://msdn.microsoft.com/en-us/library/aa468565.aspx.*

Andrew Jacobs CTO, HandCoded Ltd.; "Correctly Resolving Schema Namespace URLs in Commercial Java Applications"; 7 pages.*

W3C XML Schema Definition Language (XSD) 1.1 Part 1: Structures; W3C Recommendation Apr. 5, 2012; 273 pages; http://www.w3.org/TR/2012/REC-xmlschema1-11-20120405/.*

W3C XML Schema Definition Language (XSD) 1.1 Part 2: Datatypes; W3C Recommendation Apr. 5, 2012; 203 pages; http://www.w3.org/TR/2012/REC-xmlschema11-2-20120405/.*

Namespaces in XML 1.0 (Third Edition); W3C Recommendation Dec. 8, 2009; 13 pages; http://www.w3.org/TR/2009/REC-xml-names-20091208/.*

Microsoft.com, "Using a Data Contract Resolver", Mar. 30, 2017, 3 pages, https://docs.microsoft.com/en-us/dotnet/framework/wcf/feature-details/using-a-data-contract-resolver.*

Json.NET Documentation, "Serialization using ContractResolver", Feb. 1, 2015, 2 pages, https://www.newtonsoft.com/json/help/html/ContractResolver.htm.*

MSDN.microsoft.com, "DataContractResolver Class", Feb. 14, 2013, 2 pages, https://msdn.microsoft.com/en-us/library/system.runtime.serialization.datacontractresolver(v=vs.100).aspx.*

IBM, List of IBM Patents or Patent Applications Treated as Related, Applicant Appendix, Jun. 10, 2015, pp. 1-2, the contents of which are incorporated herein by reference in their entirety.

United States Patent and Trademark Office, Office Action for U.S. Appl. No. 14/643,548, dated Feb. 4, 2016, pp. 1-24, Alexandria, VA, USA.

United States Patent and Trademark Office, Office Action for U.S. Appl. No. 14/643,548, dated Aug. 24, 2016, pp. 1-25, Alexandria, VA, USA.

United States Patent and Trademark Office, Office Action for U.S. Appl. No. 14/643,548, dated Apr. 7, 2017, pp. 1-24, Alexandria, VA, USA.

United States Patent and Trademark Office, Office Action for U.S. Appl. No. 14/643,548, dated Oct. 19, 2017, pp. 1-28, Alexandria, VA, USA.

United States Patent and Trademark Office, Advisory Action for U.S. Appl. No. 14/643,548, dated Jan. 9, 2018, pp. 1-5, Alexandria, VA, USA.

United States Patent and Trademark Office, Office Action for U.S. Appl. No. 14/643,548, dated Jun. 26, 2018, pp. 1-37, Alexandria, VA, USA.

Ronald Bourret, XML Namespaces FAQ, Webpage/site, Jan. 2009, pp. 1-37, Published online at: http://www.rpbourret.com/xml/NamespacesFAQ.htm#names_5.

Brian Mcbride, Jena: Implementing the RDF Model and Syntax Specification, Proceedings of Semantic Web Workshop, 2001, pp. 1-6, Hong Kong, China.

Using Qualified Names (QNames) as Identifiers in XML Content, Article: W3C Technical Architecture Group (TAG), Mar. 17, 2004, pp. 1-10, W3C, Published online at: http://www.w3.org/2001/tag/doc/qnameids-2004-03-17#sec-archobs.

(56) References Cited

OTHER PUBLICATIONS

Wei Zhang, et al., TDX: a High-Performance Table-Driven XML Parser, Proceedings of the 44th ACM Southeast Conference, Mar. 10, 2006, pp. 726-731, ACM, Melbourne, FL, USA.

* cited by examiner

MARKUP LANGUAGE NAMESPACE DECLARATION RESOLUTION AND PRESERVATION

BACKGROUND

The present invention relates to markup language namespaces. More particularly, the present invention relates to markup language namespace declaration resolution and preservation.

Namespaces are utilized within markup languages to define a scope of attributes and elements within a markup language document. Namespaces are defined as uniform resource identifiers (URIs) because URIs provide a mechanism by which to create unique names, though there is no requirement that a namespace defined as a URI reference an accessible document.

BRIEF SUMMARY

A method includes identifying, by a processor, an object of an in-memory object model created from markup language syntax that comprises an element value that comprises both a prefix part and a local value part; determining that the element value that comprises both the prefix part and the local value part does not have a corresponding data type definition within a schema specification used to define data types within the markup language syntax; invoking a namespace resolver service using at least the prefix part of the element value; receiving a valid namespace declaration of the prefix part from the namespace resolver service; and associating the valid namespace declaration with the prefix part as a namespace definition for the local value part of the element value.

A system includes a memory; and a processor programmed to: identify an object of an in-memory object model within the memory created from markup language syntax that comprises an element value that comprises both a prefix part and a local value part; determine that the element value that comprises both the prefix part and the local value part does not have a corresponding data type definition within a schema specification used to define data types within the markup language syntax; invoke a namespace resolver service using at least the prefix part of the element value; receive a valid namespace declaration of the prefix part from the namespace resolver service; and associate the valid namespace declaration with the prefix part as a namespace definition for the local value part of the element value within the memory.

A computer program product includes a computer readable storage medium having computer readable program code embodied therewith, where the computer readable program code when executed on a computer causes the computer to: identify an object of an in-memory object model created from markup language syntax that comprises an element value that comprises both a prefix part and a local value part; determine that the element value that comprises both the prefix part and the local value part does not have a corresponding data type definition within a schema specification used to define data types within the markup language syntax; invoke a namespace resolver service using at least the prefix part of the element value; receive a valid namespace declaration of the prefix part from the namespace resolver service; and associate the valid namespace declaration with the prefix part as a namespace definition for the local value part of the element value.

DETAILED DESCRIPTION

Figure 1:
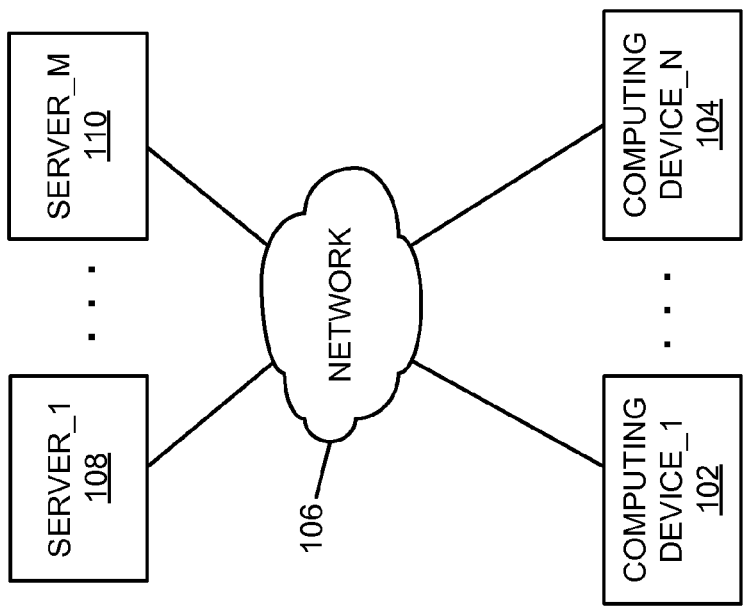
FIG. 1 is a block diagram of an example of an implementation of a system for markup language namespace declaration resolution and preservation according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides markup language namespace declaration resolution and preservation. The present technology may be implemented to resolve a namespace for any data element/object of an in-memory object model created from markup language syntax that includes an element value that itself includes both a prefix part and a local value part. In response to determining that the element value that includes both the prefix part and the local value part does not have a corresponding data type definition within a schema specification that is used to define data types within the markup language syntax, a namespace resolver service is invoked with at least the prefix part of the element value. A valid namespace declaration of the prefix part is received from the namespace resolver service. The valid namespace declaration is associated with the prefix part as a namespace definition for the local value part of the element value. As such, namespace declarations that would otherwise be lost or unavailable may be resolved and preserved by use of the present technology.

The present technology may be utilized to resolve and preserve namespace declarations that would otherwise be lost by or unavailable to a markup language parser, an in-memory data object/model processor, or an in-memory data object/model serializer. As such, the present technology is applicable to any stage of markup language or in-memory object model processing.

As a preliminary example and to provide a foundation for the examples of the present subject matter that follow, markup language documents, such as extensible markup language (XML) documents, may include namespace declarations. These namespace declarations may be declared within markup language element tags, and may be referenced within/by an associated element value and/or attribute. For example, within the example markup language syntax that follows, the namespace declaration "tns" is being referenced by a qualified name (QName) value "tns:hello":

<A xmlns="domain1" xmlns:tns="domain2">tns: hello</A>

For purposes of the present example, the element "A" has a value "hello" that is defined/valid within a namespace scope of the namespace "tns" (e.g., tns:hello). The namespace "tns" is created/defined using the XML namespace tag (e.g., "xmlns" followed by a colon character ":" and the namespace name "tns"). The namespace "tns" is a uniform resource identifier (URI) that is mapped within the present example to "domain2." The present example also defines a default namespace "domain1" using another XML namespace declaration. The scope of the value "hello" is defined/valid within the scope of the namespace "tns," but the value "hello" is considered undefined within the namespace "domain1." However, for clarity, it should be noted that if an element value "hello" were present within this example, this element value would be distinct and distinguishable from the "tns:hello" element value due to the fact that the two values specifically reference different namespaces (e.g., "domain1" versus "domain2").

When XML syntax, such as that shown within the example above, is parsed and loaded from an XML document into memory by a modeling framework, such as Eclipse Modeling Framework (EMF) or XML Cursor Interface (XCI), the XML element(s) and element value(s) are converted to in-memory objects and stored within a memory. If a schema definition, for example, for the element "A" is defined as having a QName "type," then the element value of the element "A" is stored in the memory as a QName-typed object, where the prefix in the element value references the XML namespace declaration (e.g., "tns" and thereby "domain2"). As such, the in-memory model has information that may be used to correlate the element value with the respective namespace defined in the original XML and with the appropriate data type defined in the schema due to the QName typing of the in-memory object.

During serialization of this in-memory object back to XML, the XML namespace declaration referenced within the in-memory model is written back to XML with the appropriate namespace declaration because it is recognized as a QName-typed object within the memory and/or the associated schema. For example, the following example markup language syntax would be serialized from memory to storage/disk (e.g., an XML file) based upon the QName-typed value "tns:hello":

<A xmlns="domain1" xmlns:tns="domain2">tns: hello</A>.

As can be seen from this example the original XML that was parsed and loaded into memory and the resulting XML that was serialized from the in-memory object to storage are identical. This is again because of the QName typing of the object as defined in the schema specification that is used to load the XML into memory and document in the memory the QName-typing of the data object.

It should be noted that conception of the present subject matter resulted from recognition of certain limitations associated with previous technologies for loading of markup language documents into memory and serialization of in-memory objects back to a markup language for storage and/or use by a different application. For example, it was observed that markup language serializers cut/omit namespace declarations from the serialized output if the namespace declarations are not being explicitly used in the markup language. It was further determined that markup language serializers determine whether a namespace declaration is used or not by keeping track of which QName-typed elements or attributes it is serializing. It was determined from the several observations that a problem arises with previous markup language processing technologies if the XML element's type is not the QName type, but the associated value relies on namespace declarations.

The following example markup language syntax illustrates the problem that was recognized:

<A xmlns="domain1" xmlns:tns="domain2" xmlns: tns1="other">tns:x/tns1:y</A>

Within this example, it was observed that the type of the element "A" is not a QName type. In contrast, the element value of the element "A" is "tns:x/tns1:y," which is an XML Path Language (XPath) value. It was determined that there is no XPath "type" in the schema specification for definitions of schemas. As such, it was observed that during loading of the XML into memory, even if the XML element value contains what appear to be QName tokens (e.g., tns:x/tns1:y, which is an XPath value), the modeling framework does not treat the element value as having a reference to the XML namespace declarations because there is no XPath "type" in the schema specification for definitions of schemas, and the in-memory object is not typed.

As a result, it was further determined that the non-QName type of the in-memory object causes the XML namespace declaration in the original XML to be omitted when the in-memory object model is later serialized from the memory and saved back to XML. It was determined that the following example markup language syntax represents what may be serialized from memory using the previous technology:

<A xmlns="domain1">tns:x/tns1:y</A>

It was also determined that both namespace declarations utilized in the element value (e.g., xmlns:tns="domain2" and xmlns:tns1="other") were omitted from the serialized output of the previous technology. It was further determined that this previous form of processing resulted in a loss of data from the information set (infoset). It was additionally determined that from the modeling framework's implementation point of view, this form of serialization resulted because the type of the in-memory object is not specified as the QName type, and that as such, the framework does not parse the XML element value to look for QName tokens.

It was further determined that this problem exists with any previous XML processing unit that works with an object data model representing an XML document, and that as such, several markup language processing domains where the problem exists include: standalone XML parsing (e.g., document object model (DOM) parsing, EMF, etc.), service data object (SDO)-based models, web services processors (e.g., Simple Object Access Protocol (SOAP), etc.), and any processors that work with XML-based data such as Business Process Management (BPM).

In view of this identified problem with previous markup language processing, it was determined that a solution that allows flexible identification and resolution of namespaces for non-QName typed data objects was needed. It was further determined that the solution should be applicable during multiple stages of markup language/memory model processing, including during parsing of markup language from a file to create an in-memory object/model, during modification of a dynamic in-memory data object model of a markup language document, and/or during serializing an in-memory object back to markup language. The present subject matter improves in-memory data object/model processing and serialization by providing for markup language namespace declaration resolution and preservation, as described above and in more detail below. As such, improved namespace declaration preservation may be obtained through use of the present technology.

It should be noted that a namespace association may exist within the context of any form of data and may take on various forms. As such, while the examples herein utilize a colon character-separated prefix and value (e.g., "ns1:domain1"), other forms of prefixing are possible and are considered within the scope of the present subject matter, (e.g., {ns1}domain1, ns1|domain1, or even within a natural language sentence, etc.). Further, arbitrary pieces of data that are un-prefixed may have namespaces associated with them. As such, the present technology may be applied to any section of data to resolve and declare a namespace for the piece of data.

Additionally, the present technology may be applied within many different implementation platforms. For example, a markup language parser, such as an extensible markup language (XML) parser, may be based upon stand-alone markup language processing, service data object (SDO) processing, Web Services processing, Business Process Management (BPM) processing, Eclipse Modeling Framework (EMF) processing, XML Cursor Interface (XCI) processing, or other form of processing as appropriate for the given implementation. As such, any form of processing of any form of markup language may utilize the technology described herein.

The present technology may be utilized for example to resolve and preserve namespace declarations for non-qualified name (non-QName) typed elements and values in association with serialization of in-memory data objects to a markup language. Serialization may be performed, for example, to store the in-memory model in a markup language format either for archiving or to provide the markup language representation of the model to another application (e.g., cross-application communication and serialization of object models/information).

The terms "serialization" or "serializing" as used herein refer to a process of writing in-memory objects/elements to text form, such as extensible markup language (XML), so that the in-memory objects may be stored/archived for later use by the same or a different application or process. For example, serialization may occur when one application creates and/or processes an object that is to be stored out of memory as markup language content and consumed at a later time or further processed by another application. The first application may write the in-memory object to text, and store the text version of the object. The second application may parse the text and create the in-memory object again for further processing within its own memory space. Serialization may occur at each interface between applications and/or process memory spaces.

It should additionally be noted that the examples herein utilize markup languages, and in particular extensible markup language (XML), and serialization of XML for purposes of description. The present subject matter may also be applied to other forms of markup language, such as hypertext markup language (HTML) (e.g., <html xmlns:url="myURL.com"><body>url:news</body></html>). Further, it is understood that the present technology may be applied to any form of serialized information that utilizes namespaces, as appropriate for the given implementation.

It should be noted that the examples herein utilize in-memory object serialization throughout for purposes of example and description. However, it is also understood that the present technology may also be utilized at any time during handling of a markup language document or data object/model. For example, the present technology may also be utilized during parsing of markup language from a file, such as where the parser provides an opportunity for the namespace resolver to augment the original incoming markup language document. As another alternative, the present technology may also be utilized during a dynamic in-memory data object model modification of a markup language document, such as where a user of the markup language parser or in-memory data object/model processor instructs an element change that may result in a need for additional namespace declarations (e.g., a user instruction to change a value of an element from "abc" to a namespace scoped value "myNS:abc," and the namespace resolver service is invoked to determine whether any additional declarations within the namespace "myNS" need to be added to support the new namespace scoped value "myNS:abc"). As such, the present technology may be applied in several different manners as appropriate for a given implementation, and all such applications of the present technology are considered to be within the scope of the present subject matter.

To solve the identified problem with previous markup language processing technologies, the present subject matter implements a namespace resolver service with mapped return values that may be defined by users and invoked by a markup language processing unit (e.g., a modeling framework such as EMF, XCI, etc.) when parsing a document. The respective markup language processing unit may associate a set of namespace prefixes (e.g., non-QName typed) with a particular document section and, as such, may avoid loss of data during subsequent processing and/or serialization of the in-memory objects to markup language. The present technology allows users to control which namespace declarations are to be present and preserved in a particular document section by defining return values for the automated processing performed by the namespace resolver service.

The markup language processing unit is augmented with a namespace resolver service module, function, or other form of service implementation. The namespace resolver service may include any form of implementation, such as for example, the following namespace mapping method/function that implements the namespace resolver service:

"Map<String, String>resolveNamespaces(String data)"

Using the namespace mapping method, the processing unit passes in data, such as a prefixed value specified for a markup language or in-memory element. The user-implementation of the namespace resolver service programmatically returns a mapping of the respective prefix to the namespace URI (e.g., prefix->namespaceURl) that needs to be declared for that data element's scope. As such, the user/creator of the markup language content may define custom namespaces/scopes that are to be preserved through various stages of processing of the markup language content, including parsing into memory, in-memory object/ model modification, and serialization of the in-memory object/model back to markup language.

As a first example of implementation of the present technology, the following example markup language syntax may be processed using the namespace resolver service (again at any appropriate stage of markup language and/or in-memory object/model processing):

"<A xmlns="domain1">tns:x/tns1:y</A>"

As can be seen within this example, there is no namespace declaration (e.g., xmlns) for the prefixes "tns" or "tns1" within the example markup language syntax. However, the markup language processing unit may invoke a programmatic call to the namespace resolver service to determine namespace mappings for the respective prefixes using the element value as follows:

resolveNamespaces ("tns:x/tns1:y")

As can be seen, the element value "tns:x/tns1:y" has been passed as "String" data to the resolveNamespaces method/function. From the resolveNamespaces method/function, the markup language processing unit receives a map with a key and value pairing (e.g., key,value). Within the present example, the key and value pairing returned to the markup language processing unit may be represented as the following listing of key/value pairs:

(key,value): ("tns", "domain2"), ("tns1", "other")

Within the present example, the resolveNamespaces method/function has mapped the namespace prefix "tns" to "domain2," and has mapped the namespace prefix "tns1" to "other." Based upon the returned mapping of the key/value pairs, the markup language processing unit may process the respective parsing, in-memory object/model modification, or serialization operations to preserve the mapped namespaces. For example, when the markup language processing unit serializes the example markup language syntax, it may be serialized to preserve the respective namespaces as follows:

<A xmlns="domain1" xmlns:tns="domain2" xmlns:tns1="other">tns:x/tns1:y</A>

As can be seen from the present example, the original example markup language syntax that did not include namespace declarations may be augmented to add and preserve namespaces in an automated manner. As such, the namespace resolver service provides technology and capabilities to augment markup language documents, in-memory objects/models, and serialized markup language output.

As a second example of implementation of the present technology, the following example markup language syntax may be processed using the resolveNamespaces method/function that implements the namespace resolver service:

"<B>custom data xciPrefix:element</B>"

As can be seen within this example, there is no namespace declaration (e.g., xmlns) at all within the example markup language syntax. However, the markup language processing unit may invoke a programmatic call to the resolveNamespaces method/function to determine a namespace mapping for the "xciPrefix" using the element value as follows:

resolveNamespaces("custom data xciPrefix:element")

As can be seen, the element value "custom data xciPrefix:element" has been passed as "String" data to the resolveNamespaces method/function.

From the resolveNamespaces method/function, the markup language processing unit receives a map with a key and value pairing (e.g., key,value). Within the present example, the key and value pairing returned to the markup language processing unit may be represented as the following listing of key/value pairs:

(key,value): ("xciPrefix", "www.company.com/xci")

Within the present example, the resolveNamespaces method/function that implements the namespace resolver service has mapped the namespace prefix "xciPrefix" to "www.company.com/xci." Based upon the returned mapping of the key/value pair, the markup language processing unit may process the respective parsing, in-memory object/model modification, or serialization operations to preserve the mapped namespaces. For example, when the markup language processing unit serializes the example markup language syntax, it may be serialized to preserve the respective namespaces as follows:

<B xmlns:xciPrefix="www.company.com/xci">custom data xciPrefix:element</B>

As can be seen from the present example, the original example markup language syntax that did not include any namespace declaration may be augmented to add and preserve a namespace declaration in an automated manner. As such, the namespace resolver service provides technology and capabilities to augment markup language documents, in-memory objects/models, and serialized markup language output.

The examples above illustrate the flexibility of the namespace resolver service described herein. A developer/user may define any custom type of data in their markup language and may explicitly control which prefixes get declared and preserved. The type of data may be of any arbitrary form/format, as appropriate for the given implementation. The type of data or its contents may be abstracted (e.g., hidden) from the markup language processing unit by use of the namespace resolver service. As such, the markup language processing unit does not have to be modified to accommodate and process new data types, and the namespace resolver service may be provided to perform the data type enhancement/augmentation. This layer of abstraction may further improve performance of the markup language processing unit by avoiding a full semantic parse of the respective section of markup language (for parsing into memory) or of the in-memory model (for modifications or serialization) by the markup language processing unit.

Processing instructions may specify a namespace resolver service address that may be used or invoked by a markup language processing unit. The namespace resolver service may take as input any element value that contains a potentially ambiguous prefixed or otherwise arbitrary type of data that may be undeclared or undefined within an associated schema specification. The namespace resolver service resolves the namespace as a proxy/helper service to the markup language processing unit. The markup language processing unit uses the resolved namespace and inserts the resolved namespace and prefix (either into the in-memory model or into the serialized output during serialization). Accordingly, the resolved namespace and prefix values may be preserved at the time of serialization, and may also be resolved at the time of parsing into memory or during in-memory object/model processing of modifications to the object/model.

It should be noted that a resolved namespace may be referenced in the memory, and may be represented as an object, where each element may have zero to many attributes and zero to many namespaces, with one single text section. However, a given element may have one or more child elements and each of these child elements may inherit the namespace of the parent element. As such, the namespace resolver service as described herein may be passed any piece of text and may return a namespace for whatever element is passed to the namespace resolver service. Further, the namespace may be applied to the element itself and, where the element is a parent element, to the hierarchy of elements below the element. The namespace resolver service is responsible for analyzing the data. The analysis of the data may be dependent upon the application that invokes the namespace resolver service and the amount and structure of the data that is passed to the namespace resolver service. Large or small blocks of data may be passed to the namespace resolver service, and the namespace resolver service may be configured to resolve namespaces on an element-by-element basis. The user may configure the namespace resolver service to map the namespaces that are intended to be kept by the namespace resolver service. Accordingly, all or a portion of in-memory data may be passed to the namespace resolver service to retrieve namespace declarations.

Regarding possible implementations of the namespace resolver service, the namespace resolver service may be implemented in hardware, or may be implemented as a method/function that may be invoked (e.g., the Java™ programming language, C++ programming language, etc.). The namespace resolver service may be implemented locally with a direct method/function invocation, or may be invoked remotely using hypertext transfer protocol (HTTP). As such, the namespace resolver service may be implemented as a program or uniform resource locator (URL) that is invoked with data passed to it, and may be implemented as a hardware module as appropriate for a given implementation.

The markup language namespace declaration resolution and preservation described herein may be performed in real time to allow prompt resolution of namespace declarations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for markup language namespace declaration resolution and preservation. A computing device_1 102 through a computing device_N 104 communicate via a network 106 with several other devices. The other devices include a server_1 108 through a server_M 110.

As will be described in more detail below in association with FIG. 2 through FIG. 5, the computing device_1 102 through the computing device_N 104 and the server_1 108 through the server_M 110 may each provide automated markup language namespace declaration resolution and preservation. The automated markup language namespace declaration resolution and preservation allows each device to perform processing to resolve and preserve namespace declarations during markup language parsing from storage (e.g., a file, buffer, etc.), during in-memory data object/model processing, and/or during in-memory data object/model serialization to storage (e.g., a file, buffer, etc.). It should be noted that the respective devices in the system 100 may each host one or more applications that may communicate using serialized markup language documents as described herein. Further, the respective devices in the system 100 may receive and/or create markup language documents, parse the markup language documents into memory to create in-memory models/representations of the contents of the parsed markup language documents, process the in-memory representations of the contents of the markup language documents, serialize in-memory models (modified or otherwise) back to the markup language format, and store the serialized markup language document. Further, the respective devices may send the serialized markup language document to other remote devices and/or to local or remote applications, as appropriate for the given implementation. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, an application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
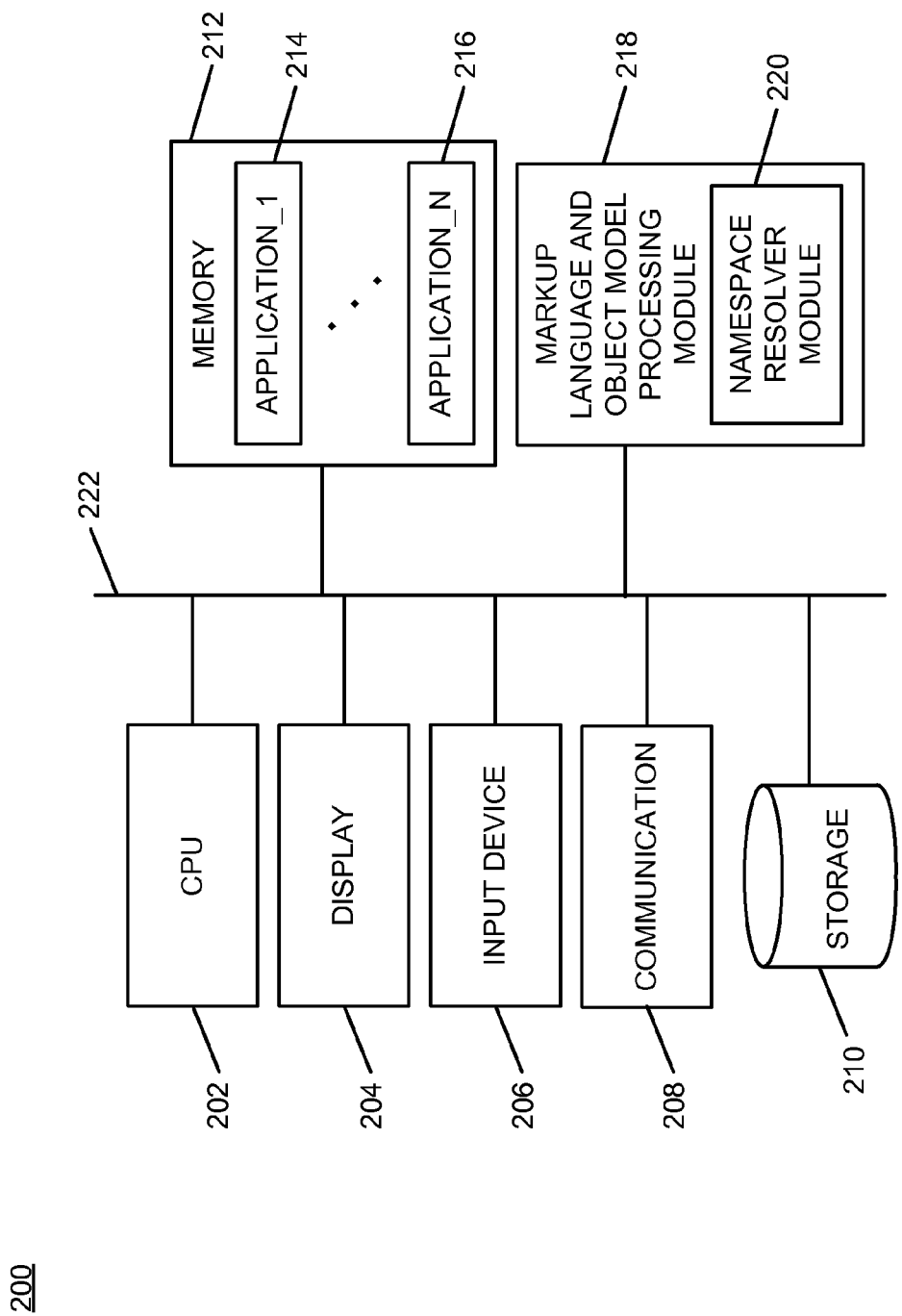
FIG. 2 is a block diagram of an example of an implementation of a core processing module capable of performing markup language namespace declaration resolution and preservation according to an embodiment of the present subject matter.

FIG. 2 is a block diagram of an example of an implementation of a core processing module 200 capable of performing markup language namespace declaration resolution and preservation. The core processing module 200 may be associated with any of the computing device_1 102 through the computing device_N 104 and/or the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for resolution and preservation of namespace declarations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities usable to provide interconnection capabilities, appropriate for a given implementation.

A storage device 210 provides storage for serialized markup language documents. The storage device 210 may be implemented, for example, as one or more of a hard drive, a communication buffer for inter-device or inter-application communications, or otherwise as appropriate for a given implementation. The storage device 210 may also provide storage for one or more applications that execute within the core processing module 200.

A memory 212 includes an application_1 area 214 through an application_N area 216. The application_1 area 214 through the application_N area 216 each provide execution space and in-memory model processing space for an application within the core processing module 200. As described above, different local and remote applications may create or parse markup language documents into the respective application areas in the respective memories of the respective core processing modules, may process the respective in-memory models, and may serialize the in-memory models back to markup language, such as for storage in a device such as the storage device 210. The applications may communicate information in the form of serialized markup language documents.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, an operating system storage area, a code execution area, and a data area without departure from the scope of the present subject matter.

A markup language and object model processing module 218 is also illustrated. The markup language and object model processing module 218 may operate in association with markup language parsing during creation of in-memory object models. The markup language and object model processing module 218 may also operate in association with processing of in-memory object models, such as for modifications to the in-memory object models and reflection of changes to markup language. The markup language and object model processing module 218 may additionally operate in association with serialization of in-memory objects and in-memory object models to markup language. As described above and in more detail below, namespace resolution may be performed during any of these distinct phases of processing markup language and associated in-memory objects/models.

The markup language and object model processing module 218 includes a namespace resolver module 220 that provides the namespace resolver service during any of parsing markup language content, processing of in-memory models, and serialization of in-memory models back to markup language for the core processing module 200, as described above and in more detail below. As such, the namespace resolver module 220 may operate as a service component for the markup language and object model processing module 218, and the markup language and object model processing module 218, in combination with the namespace resolver module 220, may operate as a service component to applications. The markup language and object model processing module 218 and the namespace resolver module 220 implement the automated markup language namespace declaration resolution and preservation of the core processing module 200.

The namespace resolver module 220 may implement or utilize physical memory for storage of namespace declaration mappings (e.g., a namespace declaration mapping table or other implementation) between customized or otherwise non-schema defined prefixes or arbitrary data types/values and customized or user-defined namespaces. Alternatively, the namespace resolver module 220 may store the namespace declaration mapping table within a memory such as the memory 212, as appropriate for the given implementation. As such, the namespace resolver module 220 may receive element values (e.g., full element values, prefixes, or other forms of data values/types), and may perform a lookup of the respective namespace declaration mappings to identify an appropriated/defined namespace declaration for the received element value and may return the mapped namespace declaration in response to invocation of the namespace resolver service provided by the namespace resolver module 220.

Many variations of implementation of the markup language and object model processing module 218 and the namespace resolver module 220 are possible. For example, one implementation of the namespace resolver module 220 may be provided per system for use by all applications that execute on the respective platform. Alternatively, there may be one implementation of the namespace resolver module 220 for each application.

It should also be noted that the markup language and object model processing module 218 and the namespace resolver module 220 may form a portion of other circuitry described without departure from the scope of the present subject matter. Further, the markup language and object model processing module 218 and the namespace resolver module 220 may alternatively be implemented as an application stored within the memory 212. In such an implementation, the markup language and object model processing module 218 and the namespace resolver module 220 may include instructions executed by the CPU 202 for performing the functionality described herein. The CPU 202 may execute these instructions to provide the processing capabilities described above and in more detail below for the core processing module 200. The markup language and object model processing module 218 and the namespace resolver module 220 may form a portion of an interrupt service routine (ISR), a portion of an operating system, a portion of a browser application, or a portion of a separate application (e.g., applications executed within the application_1 area 214 through the application_N area 216) without departure from the scope of the present subject matter.

The CPU 202, the display 204, the input device 206, the communication module 208, the storage device 210, the memory 212, and the markup language and object model processing module 218 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 212 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
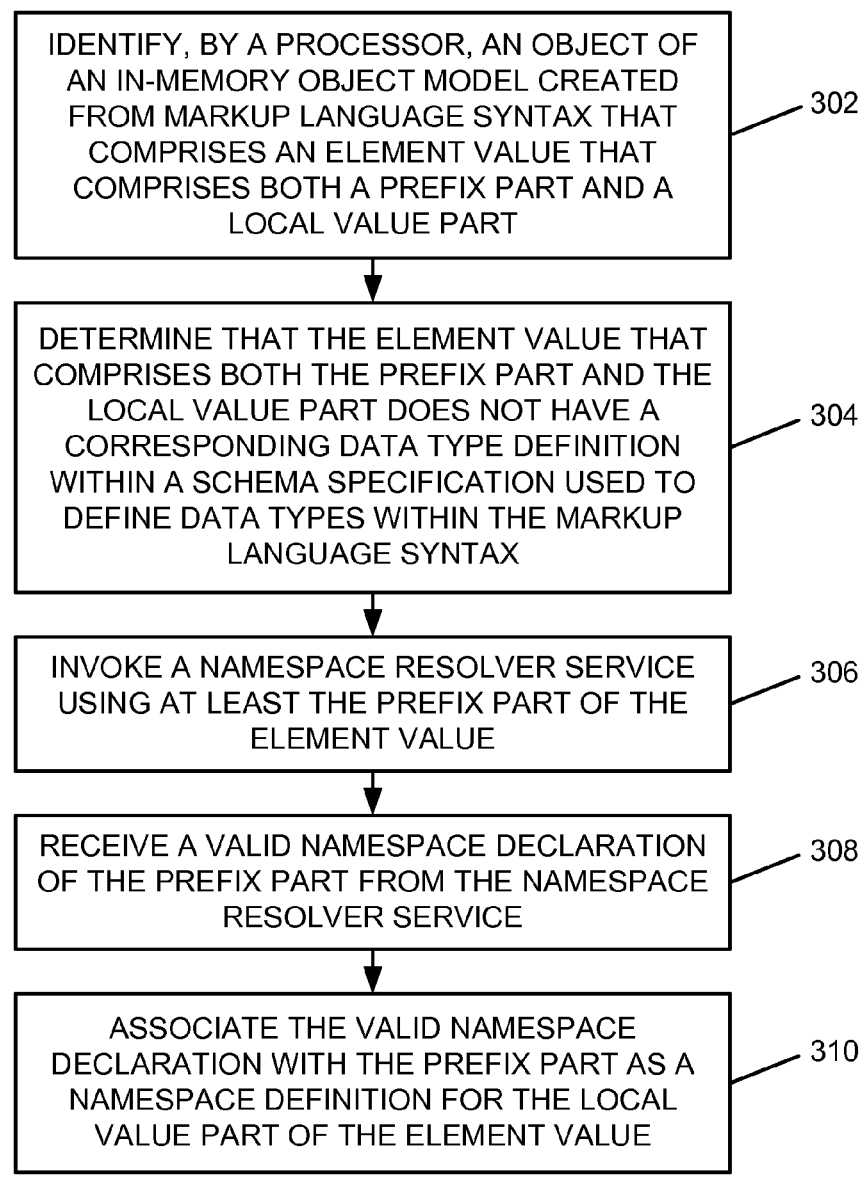
FIG. 3 is a flow chart of an example of an implementation of a process for markup language namespace declaration resolution and preservation according to an embodiment of the present subject matter.
Figure 4A:
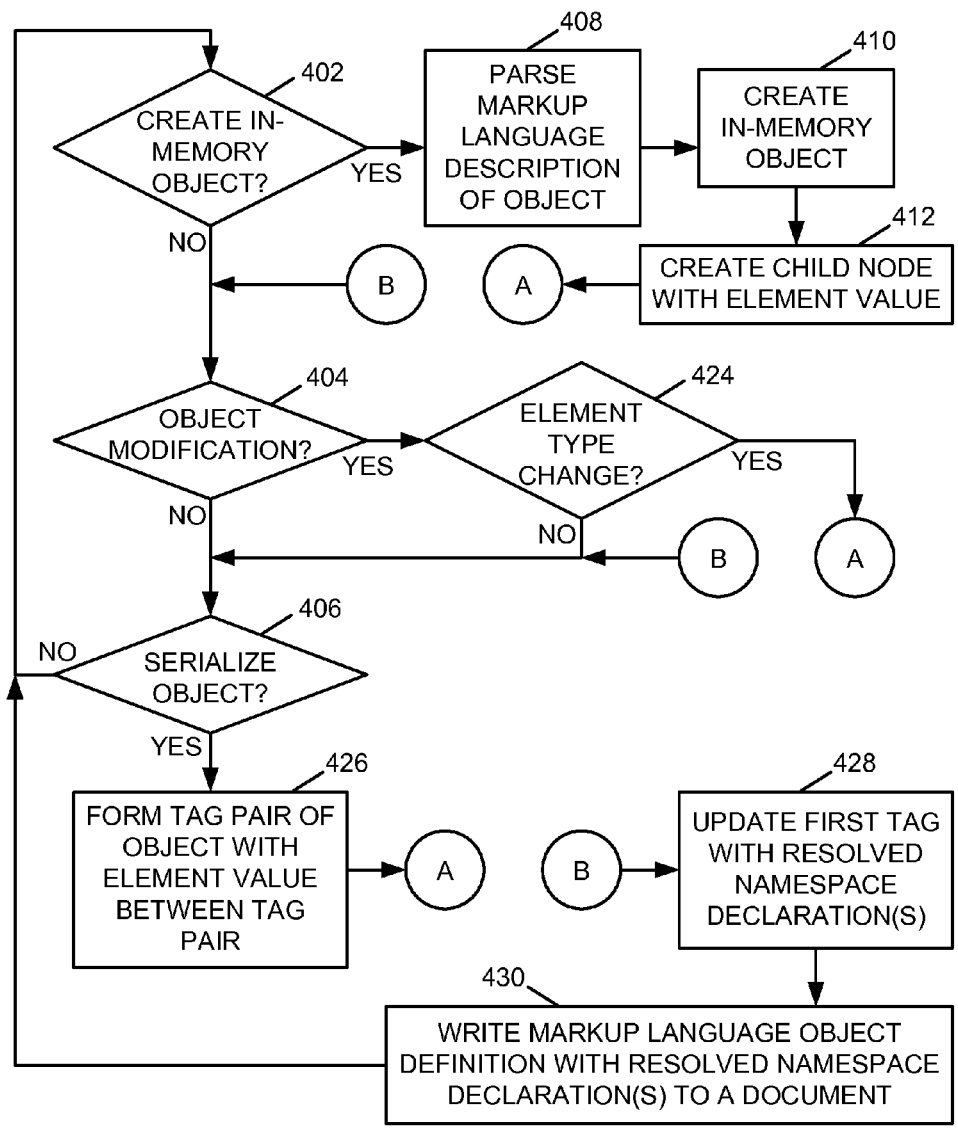
FIG. 4A is a flow chart of an example of an implementation of initial processing within a process for markup language namespace declaration resolution and preservation according to an embodiment of the present subject matter.
Figure 4B:
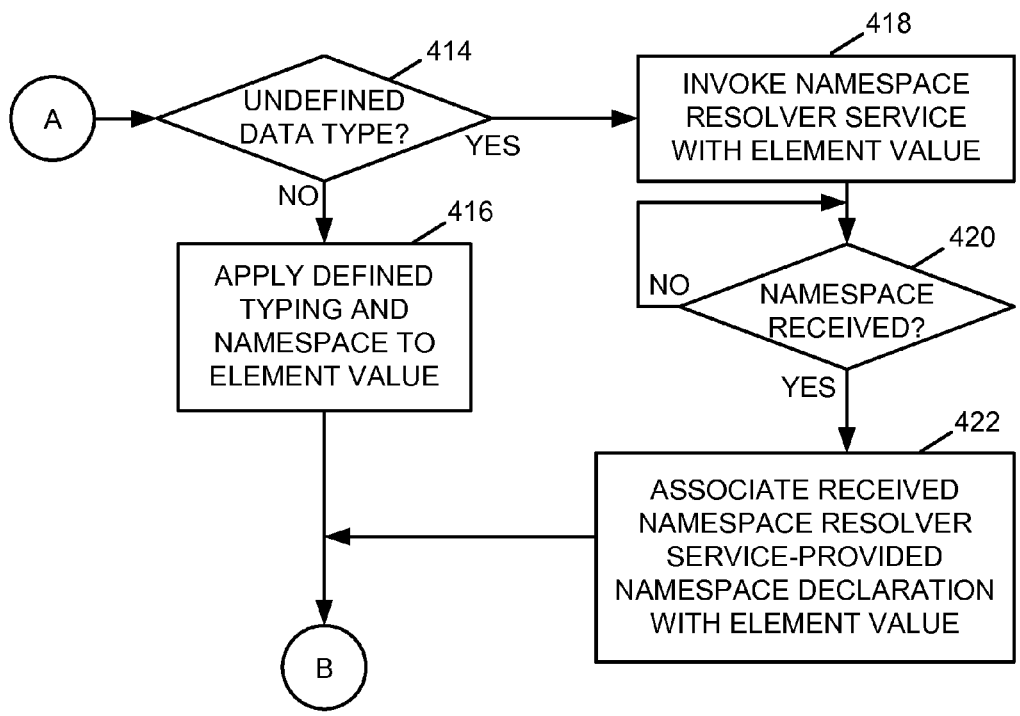
FIG. 4B is a flow chart of an example of an implementation of additional processing within a process for markup language namespace declaration resolution and preservation according to an embodiment of the present subject matter.
Figure 5:
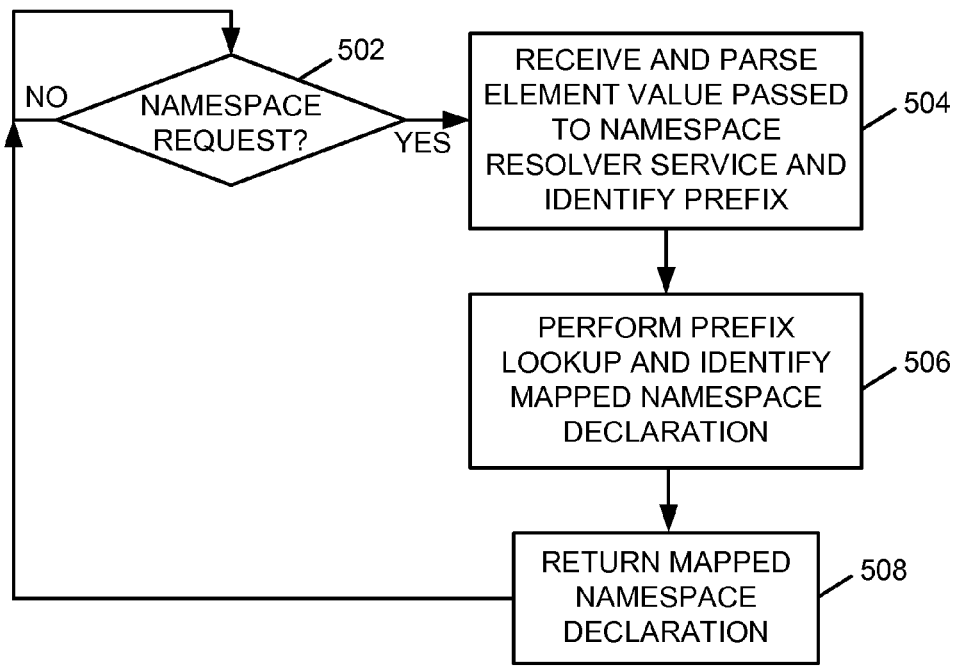
FIG. 5 is a flow chart of an example of an implementation of a process for processing associated with the namespace resolver service for markup language namespace declaration resolution and preservation according to an embodiment of the present subject matter.

FIG. 3 through FIG. 5 described below represent example processes that may be executed by devices, such as the core processing module 200, to perform the automated markup language namespace declaration resolution and preservation associated with the present subject matter. Many other variations on the example processes are possible and all are considered within the scope of the present subject matter. The example processes may be performed by modules, such as the markup language and object model processing module 218 and the namespace resolver module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for markup language namespace declaration resolution and preservation. At block 302, the process 300 identifies, by a processor, an object of an in-memory object model created from markup language syntax that comprises an element value that comprises both a prefix part and a local value part. At block 304, the process 300 determines that the element value that comprises both the prefix part and the local value part does not have a corresponding data type definition within a schema specification used to define data types within the markup language syntax. At block 306, the process 300 invokes a namespace resolver service using at least the prefix part of the element value. At block 308, the process 300 receives a valid namespace declaration of the prefix part from the namespace resolver service. At block 310, the process 300 associates the valid namespace declaration with the prefix part as a namespace definition for the local value part of the element value.

FIGS. 4A and 4B illustrate a flow chart of an example of an implementation of process 400 for markup language namespace declaration resolution and preservation. FIG. 4A illustrates initial processing within the process 400. For purposes of the present example, each of parsing of markup language content into memory, processing of in-memory models, and serialization of in-memory models back to markup language are illustrated within the same process 400. However, it should be noted that these distinct phases of operations may be included separately within different processes or tools as appropriate for a given implementation. These distinct processes are illustrated within the same process 400 for ease of description purposes, and to further illustrate that each of these distinct forms of processing may utilize the namespace resolver service to resolve and preserve markup language namespace declarations.

Higher-level iterative processing associated with the process 400 will be described prior to describing affirmative processing associated with individual decision points. At decision point 402, the process 400 makes a determination as to whether to create an in-memory object by parsing markup language content. In response to determining not to create an in-memory object by parsing markup language content, the process 400 makes a determination at decision point 404 as to whether to modify an in-memory object as part of in-memory object/model processing. In response to determining not to modify an in-memory object as part of in-memory object/model processing, the process 400 makes a determination at decision point 406 as to whether to serialize an in-memory object to markup language. In response to determining not to serialize an in-memory object to markup language, the process 400 returns to decision point 402 and iterates as described above.

It should be noted that the processing associated with the respective decision points is granulized to the object level for ease of illustration purposes. The respective affirmative processing may be repeated for each object to be created, modified, or serialized as appropriate for a given implementation. Further, the examples that follow presume that the element value to be processed is a prefixed type with both a prefix part and a local value part that does not have a corresponding data type definition within a schema specification used to define data types within the markup language syntax. As such, the particular element value may be a custom data type created by a user, such as a type other than a QName type or some other form of customized qualified named value that is not defined within the schema specification used to define data types within the markup language syntax. It is understood that, while the processing described in association with the process 400 utilizes prefixed values for ease of description purposes, this processing may be utilized to process any arbitrary element or segment of data for which a namespace is to be resolved and/or preserved as appropriate for a given implementation.

Regarding parsing of markup language content into memory and returning to the description of decision point 402, in response to determining to create an in-memory object by parsing markup language content, the process 400 parses the markup language description/representation of the object at block 408. At block 410, the process 400 creates the in-memory object. At block 412, the process 400 creates a child node with the element value designated within the markup language syntax.

The process 400 transitions to the processing shown and described in association with FIG. 4B. It should be noted that the processing described in association with FIG. 4B is utilized by each higher-level processing phase of the process 400 described above and as described in more detail below.

FIG. 4B illustrates additional processing associated with the process 400 for markup language namespace declaration resolution and preservation. At decision point 414, the process 400 makes a determination as to whether at least the prefix part of the element value has an undefined/unknown data type without a namespace declaration (e.g., a prefixed or arbitrary data form/format or typing that is not defined within the associated schema and for which a namespace is either not defined or not resolved by a URI). For example, the process 400 may determine that a type of the element value that includes both the prefix part and the local value part is not a qualified name (QName) type defined by the schema specification. In response to determining that the element value has a defined data type (i.e., does not have an undefined/unknown data type), the process 400 applies the defined typing and namespace to the element value at block 416. Additional processing after the processing at block 416 will be deferred and described in more detail below.

In response to determining at decision point 414 that the element value has an undefined/unknown data type without a namespace declaration, the process 400 invokes a namespace resolver service, such as provided by the namespace resolver module 220, at block 418. As described above, the namespace resolver service may be invoked to resolve a namespace that is otherwise undefined or that is unknown by use of an associated schema, and may return a resolved namespace declaration to be preserved. The namespace resolver service may be user-defined or other data-type customized to provide scope and meaning to element values by mapping the respective element values to resolved namespace declarations.

At decision point 420, the process 400 makes a determination as to whether a valid resolved namespace declaration has been received from the invoked namespace resolver service. Receiving the valid namespace declaration may include receiving the valid namespace declaration of the prefix part from the namespace resolver service and may include receiving an associated namespace declaration mapped to the prefix part of the element value within a namespace declaration mapping table.

In response to determining that the resolved namespace declaration has been received from the namespace resolver service, the process 400 associates the received valid namespace declaration with the element value at block 422. As described above, and as described in more detail below, this association may be performed during any of several processing phases of markup language. For example, the association may be performed within a memory in association with parsing of markup language syntax during creation of an in-memory object, and may include associating the prefix part with the valid namespace declaration as the namespace definition for the local value part of the element value of the object of the in-memory object model created from the markup language syntax. This association may also be performed within a memory in association with modification of an in-memory object/model during in-memory object/model processing, including detecting a modification of the object of the in-memory object model that results in the element value including both the prefix part and the local value part, and associating the prefix part with the valid namespace declaration as a namespace definition for the local value part of the element value of the object of the in-memory object model created from the markup language syntax. This association may additionally be performed within a memory in association with serialization of an in-memory object/model to markup language and storage of the serialized element to a file, and may include inserting, during serialization of the in-memory object model to a serialized markup language document, the valid namespace declaration into the serialized markup language document in association with a serialized representation of the object and the element value that comprises both the prefix part and the local value part.

In response to associating the received namespace declaration with the element value at block 422, or in response to applying the defined typing and namespace to the element value at block 416, the process 400 returns to FIG. 4A at decision point 404 and iterates as described above and further below.

Regarding the processing of in-memory models and returning to the description of decision point 404, in response to determining to modify an in-memory object as part of in-memory object/model processing, the process 400 makes a determination at decision point 424 as to whether the detected in-memory object modification results in an element type change. For example, an element value may be changed from a QName type to a non-schema defined type for which the namespace resolver service may be invoked to resolve the namespace. In response to determining that the detected in-memory object modification does not result in an element value type change, the process 400 continues to decision point 406 and the higher-level iterations as described above.

In response to determining at decision point 424 that the detected in-memory object modification results in an element value type change, the process 400 again transitions to the processing described above in association with FIG. 4B to either apply the defined typing and namespace to the element value, or to invoke the namespace resolver service to resolve the namespace declaration and associate the resolved namespace with the changed element type, as described above. Upon completion of the processing described within FIG. 4B, incorporated by reference from above, the process 400 returns to FIG. 4A at decision point 406 and iterates as described above and further below.

Regarding serialization of in-memory models back to markup language and returning to the description of decision point 406, in response to determining to serialize an in-memory object to markup language, at block 426 the process 400 forms a syntactic markup language tag pair of the in-memory object to be serialized with the element value of the in-memory object written between the tag pair. Again, for purposes of the present example, it is assumed that a namespace declaration either does not exist in memory for the prefixed element value or that the value is a non-QName-typed value (undefined by an associated schema) and that the serializer is unable to resolve and write a namespace for the prefixed element value to the serialized markup language syntax. As such, the process 400 again transitions to the processing described above in association with FIG. 4B to either apply the defined typing and namespace to the element value, or to invoke the namespace resolver service to resolve the namespace declaration and associate the resolved namespace with the changed element type, as described above. Upon completion of the processing described within FIG. 4B, incorporated by reference from above, the process 400 returns to FIG. 4A at block 428.

At block 428, the process 400 updates a first tag of the tag pair with the resolved namespace declaration(s) within the serialized markup language syntax. It should be noted that with customized data types, more than one prefix may be present in the element value. As such, more than one namespace declaration may be returned by the namespace resolver service and associated with the element value.

At block 430, the process 400 writes the markup language object definition with the resolved namespace(s) to a document. The process 400 returns to decision point 402 and iterates as described above.

As such, the process 400 performs parsing of markup language content into memory, processing of in-memory models, and serialization of in-memory models back to markup language. During each form of processing, the process 400 may invoke the namespace resolver service to resolve namespaces that are otherwise unable to be resolved without the namespace resolver service.

FIG. 5 illustrates a flow chart of an example of an implementation of a process 500 for processing associated with the namespace resolver service for markup language namespace declaration resolution and preservation. As described above, the namespace resolver service may be associated with and may be invoked from a process, such as the process 400 at block 418 of FIG. 4B described above. As such, in-memory object/model creation/parsing, processing, and serialization may each utilize the namespace resolver service to resolve namespace declaration(s) for undefined element value types. It is understood that the namespace resolver service may operate under either the same process or a different process, whether local or remote to the device/application that is executing the process 400 and invoking the namespace resolver service. It is further understood that the process 400 is also considered to include processing to define a namespace declaration mapping table within a memory. The namespace declaration mapping table may include mappings between undefined data types (e.g., data types not defined within the schema specification) and associated namespace declarations. As such, many possibilities exist for implementation of the namespace resolver service and all such possibilities are considered within the scope of the present subject matter.

At decision point 502, the process 500 makes a determination as to whether a request to invoke the namespace resolver service to resolve an undefined namespace has been received. In response to determining that request to resolve an undefined namespace has been received, the process 500 receives and parses the element value passed to the namespace resolver service and identifies a prefix of the element value at block 504. At block 506, the process 500 performs a prefix lookup, such as within an associated namespace declaration mapping table, and identifies the mapped namespace declaration. At block 508, the process 500 returns the mapped namespace declaration to the calling/invoking process from which the namespace resolver service was invoked. The process 500 returns to decision point 502 to await another request to invoke the namespace resolver service and iterates as described above.

As such, the process 500 resolves namespace declaration(s) for undefined element value types in response to requests associated with parsing of markup language content into memory, processing of in-memory models, and serialization of in-memory models back to markup language.

As described above in association with FIG. 1 through FIG. 5, the example systems and processes provide markup language namespace declaration resolution and preservation. Many other variations and additional activities associated with markup language namespace declaration resolution and preservation are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer program product, comprising:
 a computer readable storage medium having computer readable program code embodied therewith, where the computer readable program code when executed on a computer causes the computer to:
  identify an object of an in-memory object model created from markup language syntax that comprises an element value that comprises both a prefix part and a local value part during serialization of the in-memory object model to a serialized markup language document;
  determine that the element value, that comprises both the prefix part and the local value part, does not have a corresponding data type definition within any of one or more schema specifications used to define data types within the markup language syntax, comprising causing the computer to determine that a type of the element value, that comprises both the prefix part and the local value part, is not a qualified name (QName) type defined by any of the one or more schema specifications;

invoke a namespace resolver service using at least the prefix part of the element value to resolve a data type for the element value that is undefined according to any of the one or more schema specifications;

receive a valid namespace declaration of the prefix part from the namespace resolver service, with the valid namespace declaration including information indicative of a domain and a scope of an environment defined by the namespace resolver service to hold a logical grouping of unique names of undefined data types; and associate the valid namespace declaration with the prefix part as a namespace definition for the local value part of the element value, thereby preserving the valid namespace declaration, comprising causing the computer to insert, during the serialization of the in-memory object model to the serialized markup language document, the valid namespace declaration into the serialized markup language document in association with a serialized representation of the object and the element value that comprises both the prefix part and the local value part.

2. The computer program product of claim 1, where the computer readable program code when executed on the computer further causes the computer to:

detect the object of the in-memory object model created from markup language syntax that comprises the element value that comprises both the prefix part and the local value part during parsing of the markup language syntax during creation of the object of the in-memory object model.

3. The computer program product of claim 1, where the computer readable program code when executed on the computer further causes the computer to:

detect, during in-memory object-model processing, a modification of the object of the in-memory object model that results in the element value comprising both the prefix part and the local value part.

4. The computer program product of claim 1, where, in causing the computer to invoke the namespace resolver service using at least the prefix part of the element value to resolve the data type for the element value that is undefined according to any of the one or more schema specifications, the computer readable program code when executed on the computer causes the computer to invoke a user-defined custom-data-type namespace resolver service.

5. The computer program product of claim 1, where the computer readable program code when executed on the computer further causes the computer to:

define, via the namespace resolver service responsive to user input, a namespace declaration mapping table within a memory, where the namespace declaration mapping table comprises user-defined mappings between the undefined data types and associated namespace declarations; and where, in causing the computer to receive the valid namespace declaration of the prefix part from the namespace resolver service, the computer readable program code when executed on the computer causes the computer to receive an associated namespace declaration mapped according to a user definition to the prefix part of the element value within the namespace declaration mapping table from the namespace resolver service.

6. The computer program product of claim 1, where the computer readable program code further comprises markup language parser instructions based on an element selected from a group consisting of stand alone, Service Data Object (SDO), Web Services, Business Process Management (BPM), Eclipse Modeling Framework (EMF), and Markup Language Cursor Interface.

7. The computer program product of claim 6, where the computer readable program code further comprises namespace resolver services instructions further comprise resolving instructions programmed to, when utilized by the markup language parser instructions, cause the computer to resolve ambiguous qualified names (QNames) at serialization back to the serialized markup language document.

8. The computer program product of claim 1, where the computer program product is in the form of a computer system, with the computer program product further comprising:

a processor(s) set structured, programmed, and/or connected to execute the computer readable program code stored in the computer readable storage medium.

9. A computer program product, comprising:

at least one storage device structured and connected to store computer readable program code; and programmed instructions stored in the at least one storage device, where the programmed instructions when executed by a processor(s) set causes the processor(s) set to:

receive a first version of an extensible markup language (XML) document that includes a first version of a first namespace definition statement that defines a set of namespace(s) and respectively corresponding domain(s) for a first element, with the set of namespace(s) and respectively corresponding domain(s) including a first namespace corresponding to a first domain and with the first namespace expressed as part of an XML Path Language (XPath) value;

convert, by a modeling framework, the first version of the XML document to a plurality of in-memory objects stored in a memory;

subsequent to the conversion of the first version of the XML document, serialize the plurality of in-memory objects to obtain a second version of the XML document that includes a second version of the first namespace definition statement;

determine that the second version of the first namespace definition statement includes the first namespace, but does not include the first domain corresponding to the first namespace; and responsive to the determination that the second version of the first namespace definition statement includes the first namespace, but does not include the first domain corresponding to the first namespace, insert, by a namespace resolver, the first domain, corresponding to the first namespace expressed as the part of the XPath value, into the second version of the first namespace definition statement to generate a third version of the XML document that includes a third version of the first namespace definition statement, where the third version of the first namespace definition statement properly resolves the first namespace to the first domain when the first namespace is expressed as the part of the XPath value within the third version of the XML document.

10. The computer program product of claim 9, where the computer program product is in the form of a computer system, with the computer program product further comprising:

the processor(s) set structured, programmed, and/or connected to execute the programmed instructions stored in the at least one storage device.

\* \* \* \* \*